United States Patent [19]

Harris et al.

[11] Patent Number: 5,591,700
[45] Date of Patent: Jan. 7, 1997

[54] FRACTURING FLUID WITH ENCAPSULATED BREAKER

[75] Inventors: Phillip C. Harris; Ronald J. Powell; Stanley J. Heath, all of Duncan, Okla.

[73] Assignee: Halliburton Company, Duncan, Okla.

[21] Appl. No.: 362,393

[22] Filed: Dec. 22, 1994

[51] Int. Cl.$^6$ .................................................. E21B 43/26
[52] U.S. Cl. .......................... 507/204; 507/260; 507/261; 507/265
[58] Field of Search ................................. 507/214, 260, 507/261, 265

[56] References Cited

U.S. PATENT DOCUMENTS

| | | | |
|---|---|---|---|
| 4,451,387 | 5/1984 | Tai | 252/174 |
| 4,770,796 | 9/1988 | Jacobs | 252/8.553 |
| 4,919,209 | 4/1990 | King | 166/300 |
| 5,102,558 | 4/1992 | McDougall et al. | 252/8.551 |
| 5,102,559 | 4/1992 | McDougall et al. | 252/8.551 |
| 5,110,486 | 5/1992 | Manalastas et al. | 252/8.551 |
| 5,164,099 | 11/1992 | Gupta et al. | 252/8.551 |

*Primary Examiner*—Richard L. Raymond
*Attorney, Agent, or Firm*—Robert A. Kent

[57] ABSTRACT

An aqueous fracturing fluid composition and method for fracturing subterranean formations penetrated by a well bore wherein the fracturing fluid comprises a viscosity breaker that comprises a surfactant and a breaker which is solid at ambient surface conditions and dissolves at temperatures in the formation.

15 Claims, No Drawings

FRACTURING FLUID WITH ENCAPSULATED BREAKER

FIELD OF THE INVENTION

This invention relates generally to fluids and procedures for hydraulically fracturing subterranean formations to stimulate production of crude oil and natural gas from wells bored into the formation. More specifically, this invention relates to fracturing fluids that contain a controlled release viscosity breaker.

BACKGROUND OF THE INVENTION

Crude oil and natural gas residing in subterranean porous formations are produced by drilling wells into the formations. Oil and/or natural gas flow into the well driven by the pressure gradient which exists between the formation and the well, by gravity drainage, by fluid displacement, and by capillary action. Typically, surface pumps are required to supplement the natural driving forces to bring the hydrocarbons to the surface.

Most wells are hydraulically fractured to increase flow. The drill pipe casing section adjacent to the zone to be fractured is perforated using explosive charges or water jets. Then a fracturing fluid is pumped down the drill pipe and into the formation at a rate and pressure high enough to fracture the formation. The fractures propagate as vertical and/or horizontal cracks radially outward from the well bore.

Solid particles called proppants are dispersed into the fracturing fluid and are carried by the fluid into the formation. Proppants lodge in the propagated fractures and hold the fractures open after the hydraulic pressure on the fracturing fluid is released and the fracturing fluid flows back into the well. Without proppants, the cracks would close and the increased conductivity gained by the fracturing operation would be lost.

The primary consideration in selecting a proppant is the pressure in the subterranean formation to be fractured. Suitable proppants include sand, graded gravel, glass beads, sintered bauxite, resin coated sand and ceramics. In formations under moderate pressure, 6000 psi or less, the most commonly used proppant is ordinary screened river sand. For formations with closure stresses 6000 to about 10,000 psi, sand proppants coated with a thermosetting phenolic resin are preferred. Sintered bauxite, glass beads and ceramics are used to fracture wells with closure pressure in the range of 10,000 to 15,000 psi.

The rheological requirements of a fracturing fluid are highly constraining. To adequately propagate fractures in the subterranean formation, the fracturing fluid must have sufficient body and viscosity to form fractures without leaking excessively into the formation. Also, a fracturing fluid must have the capability to transport and deposit large volumes of proppant into the cracks in the formation formed during fracturing. After the fracturing operation is complete and pressure on the fluid is released, the fracturing fluid must readily flow back into the well and not leave residues that impair permeability of the formation and conductivity of the fracture. Finally, a fracturing fluid must have rheological characteristics which permit it to be formulated on the surface with reasonable convenience and be pumped down the well without excessive difficulty or pressure drop friction losses.

The most commonly used fracturing fluids are water-based compositions containing a water soluble hydratable high molecular weight polymer which increases the viscosity of the fluid by forming a gel when it dissolves in the fluid. Thickening the fluid reduces leakage of liquids from the fracturing fluid into the formation during fracturing and increases proppant suspension capability.

A wide variety of hydratable water soluble polymers are used in fracturing fluid formulations including polysaccharides, polyacrylamides, and polyacrylamide copolymers. Polysaccharides are currently favored. Particularly desirable polysaccharides include galactomannan gum and cellulose derivatives. Preferred polysaccharides include guar gum, locust bean gum, carboxymethylguar, hydroxyethylguar, hydroxypropylguar, carboxymethylhydroxypropylguar, carboxymethylhydroxyethylguar, hydroxymethyl cellulose, carboxymethylhydroxyethyl cellulose and hydroxyethyl cellulose. Generally, the molecular weights of the hydratable polymers used in fracturing fluids range from about 500,000 to about 3,000,000. The ratio of apparent viscosity of the fracturing fluid relative to water at shear rates encountered in well fractures is between about 50 to about 2000. Viscosifier concentrations in fracturing fluids range from about 10 to about 100 lbs. of viscosifier per 1000 gallons of fracturing fluid.

Over the years, producers have drilled oil and gas wells to ever increasing depths to maintain reserves and production. Downhole temperatures increase with well depth and since the viscosity of fracturing fluids decrease with increasing temperature, formulations of fracturing fluids had to be modified to maintain fluid performance. Initially, the reduced viscosity of fracturing fluids at downhole conditions was compensated by increasing the concentration of hydratable polymer in the fracturing fluids. However, at current well depths, the viscosifier concentrations required to maintain adequate viscosity at downhole conditions are so high that the fracturing fluid is too viscous at ambient surface conditions to formulate and pump. The solution was to add chemical agents to the fracturing fluid which crosslink the polymer viscosifier molecules. Cross-linking increases fluid viscosity by forming chemical bonds between viscosifier polymer molecules.

The crosslinks form between cis position hydroxyl groups on adjacent polysaccharide thickener polymer molecules. Common crosslinking agents include polyvalent ions in their high valance state such as Al(III), Ti(IV), Zr(IV) in the form of salts of organic acids. Also, borate ions are effective crosslinkers for polysaccharides. The preferred cross-linking agents include zirconium and, titanium acetate, and zirconium and titanium lactate. The concentration of cross-linker typically is in the range of from about 1% to 10% by weight of polymer. The cross-linking agent is added to the fracturing fluid.

The activity of crosslinking agents increase with temperature so that crosslinking is delayed until the fracturing fluid heats as it approaches the formation. The fracturing fluids are formulated so that the cross-linking reaction is not completed until after the fracturing fluid flows into the subterranean formation. Accordingly, the viscosity of the fracturing fluid is low at the surface permitting the fluid to be easily formulated and pumped into the well and the fluid viscosity increases as the fluid flows into the subterranean formation where the higher viscosity is required.

When the fracturing operation is complete, the pressure of the fracturing fluid in the formation is reduced. Fracturing fluid flows back out of the formation into the well. It is imperative that the fracturing fluid flow quickly and completely out of the formation and back into the well to allow production of hydrocarbons. To enhance back flow of fracturing fluid out of the formation and into the well, it is necessary to reduce or "break" the viscosity of the fracturing fluid so that the fluid can flow freely.

Hydratable polymers decompose spontaneously in time from either bacteriological or thermal degradation, but these natural degradation modes are slow and too much production time would be lost if producers waited for natural degradation processes to break the fracturing fluid viscosity. To accelerate fracturing fluid viscosity reduction, a chemical agent referred to as a "breaker" is added to the fracturing fluid. Breakers operate by severing the backbone chain of the hydrated polymer.

It is critical that the viscosity breaking process does not occur before the fracturing process is completed. The breaker must effectively reduce fracture fluid viscosity, but only after the fracturing is complete. Breaking agents are water soluble components which are typically added to the fracturing fluid at the surface as the fracturing fluid is formulated. Depending on the type, the breaker may begin decomposing the viscosifying polymer as the fracturing fluid flows down the well and into the formation. If the breaker reduces viscosity of the fracturing fluid prematurely, fracture formation, proppant transport capability and fluid leakage control into the formation can all be impaired. Clearly, striking a balance between effectiveness and timeliness of the action of breaker is significant and difficult.

Enzyme breakers such as alpha and beta amylases, amyloglucosidase, oligoglucosidase invertase, maltase, cellulase, and hemicellulase are commonly used for wells having a bottomhole temperature below about 150° F. and with fracturing fluids with pH between about 3.5 and 9. Enzymes catalyze the hydrolysis of glycosidic bonds between the monomer units of polysaccharides.

Peroxygen compounds are the preferred breakers for higher temperature downhole temperatures in the range from about 140° F. to about 250° F. temperature range. They form free radicals which attack and sever the backbone of gel polymer chains. Peroxides generally decompose over a narrow temperature range characteristic of the peroxide. Accordingly, the common practice is to select a peroxide breaker which decomposes at the temperature range of the subterranean formation to be fractured.

Commonly used peroxygen breakers include dichromates, permanganates, peroxydisulfates, sodium perborate, sodium carbonate peroxide, hydrogen peroxide, tertiarybutylhydroperoxide, potassium diperphosphate, and ammonium and alkali metal salts of dipersulfuric acid, alkali and alkaline earth percarbonates and persulfates and perchlorates. Preferred breakers include ammonium and alkali and alkaline earth persulfates such as ammonium, sodium and potassium persulfate. Typical breaker addition rates range from about 0.1 to 10 lbs. per thousand gallons of fracturing fluid. Breakers are usually added to the fracturing fluid at the surface "on-the-fly" as the fluid is being pumped down the well.

Persulfates break viscosity by thermally decomposing into highly reactive sulfate free radicals which attack the polymer backbone. Thermal decomposition of persulfates is slow below 125° F., but accelerates as temperature increases in the range from about 150° F. to 225° F. Typically, the higher the formation temperature the lower the concentration of persulfate breaker in the fracturing fluid Surface active agents (surfactants) are commonly added to fracturing fluids to promote back flow of fracturing fluid out of the subterranean formation to the well after fracturing is complete. Surfactants promote return flow of fracturing fluid by lowering interfacial tension and capillary pressure in the formation fissures, and dispersing gas bubbles which form in the formation interstices to block return flow of fracturing fluid. Surfactants also disperse residual fragments of decomposed hydratable polymer into the fracturing fluid to promote their removal from the formation along with the fracturing fluid.

Fracturing fluids are formulated to limit water leakage from fracturing fluids into the formation during fracturing because water can permanently damage formations. The mechanism by which fluid leakage in well fracturing is controlled can be analogized to filtration. When fracturing is initiated, some of the fracture fluid unavoidably flows into the formation. But, as the fracturing operation proceeds, fluid leakage into the matrix is progressively restricted by continuous deposition of the polymer gel thickening agents used in fracturing fluids. The thickening agents form a thin film over the fracture face which is referred to in the fracturing technical literature as a "filter-cake." Ideally, when the fracturing operation is complete, the breaker decomposes the gel polymer molecules in the fracture fluid and in the filter-cake. Polymer gel fragment residues agglomerate into large particles which reduce the conductivity of the fracture for flow of oil and gas and thus impair production.

The surfactant disperses the polymer residue fragments into the fracturing fluid and prevents them from agglomerating so that the residual polymer fragments are flushed out of the formation along with the back flowing fracturing fluid after the fracturing operation is complete. However to effectively promote dispersal and removal of polymer fragment residues the surfactant must be in relatively high concentration in the zones where the breaker decomposes polymer gel, both in the fracturing fluid and in and around the gel filter-cake.

For the foregoing reasons there is a need for a breaker system for aqueous fracturing fluids comprising a hydratable polymer wherein the breaker system will: a) effectively decompose the hydratable polymer molecules both in the fluid and in the filter cake; b) but not until the fracturing operation is complete; and c) and wherein the breaker system will deliver surfactant in sufficient concentration to emulsify and suspend the residual gel polymer fragments in the fracturing fluid and preclude agglomeration of the polymer fragments.

SUMMARY OF THE INVENTION

The present invention is directed to an aqueous hydraulic fracturing fluid that is comprised of a water soluble hydratable polymer and a breaker system. The breaker systems of this invention comprise a breaker that is encapsulated by a water soluble surfactant; the surfactant serves both as the encapsulant material and as the surfactant. Such encapsulating surfactants are waxy surfactant materials that melt and/or dissolve into the fracturing fluids at temperatures in the subterranean formation to be fractured.

The advantage of fracturing fluids containing a breaker encapsulated by a surfactant is that the encapsulation delays the breaking action. The delivery of surfactant at the point where the breaker activity occurs promotes dispersal of polymer gel fragments in the fracturing fluid.

These and other features, aspects and advantages of the present invention will become better understood with reference to the following description and appended claims.

DESCRIPTION OF THE INVENTION

Breakers suitable for encapsulation according to the present invention are in the form of a powder or granulated solid with average particle diameter from about 30 to about 2,000 microns, preferably from about 100 to about 500 microns. Generally, it is preferable that the size of the encapsulated breaker should be close to or slightly smaller than the size of the proppant used in the fracturing fluid.

Surfactant encapsulants suitable for the present invention are materials which have surfactant activity when dissolved in water, are solid at ambient temperatures below about 100° F., and melt, soften or dissolve at temperatures in the subterranean formation to be fractured.

Surfactants are composed of groups of opposing solubility tendencies, typically an oil-soluble hydrocarbon chain and a water soluble ionic group. Surfactants promote cleaning, foaming, wetting, emulsifying, solubilizing and dispersing. Surfactants are usually soluble in at least one liquid phase of the system. The concentration of surfactant at a phase interface is greater than its concentration in the bulk of the solution. Surfactants can form micelles when the so-called critical micelle concentration of the system is exceeded.

Classes of surfactants suitable for encapsulants of this invention include carboxylates, polyalkoxycarboxylates, sulfonates including alkylbenzenesulfonates, alkylarylsulfonates, lignosufonates, naphthalenesulfonates, petroleum sulfonates, ethoxylated and sulfated alcohols, ethoxylated and sulfated alkylphenols, sulfated acids, amides and esters, sulfated natural oils and fats, phosphate esters, polyoxyethylene ethoxylates, alkylphenol ethoxylates, carboxylic acid esters, glycero esters, polyoxyethylene esters, ethoxylated natural fats, oils and waxes, glycol esters of fatty acids, carboxylic amides, polyalkylene oxide block copolymers, aliphatic mono-, di- and polyamines derived from fatty and rosin acids.

Within these categories, in accordance with this invention, suitable surfactants are solid at ambient surface conditions below about 100° F., and dissolve at temperatures in the subterranean formation to be fractured. Ideally, the surfactant should melt in the range of from about 10° F. below the temperature range in the formation to about 10° F. above the temperature range in the formation. Examples of specific suitable surfactants include: polyoxyethylene stearyl ether which is made by ICI Americas Inc. as "BRIJ 721" surfactant; polyethylene glycol monostearate made by Ethox Chemical Co. as ETHOX MS-40" surfactant; and polyoxyethylene dinonylphenol ether made by Ethox Chemical Co. as ETHAL DNP-150" surfactant. These surfactants melt between from about 120° F. and 140° F. and so are suitable for fracturing wells with downhole temperatures in this temperature range. Higher melting surfactant waxes or polymers would be used for higher temperature subterranean formations.

The breaker granules of the present invention are encapsulated using either melt based coating methods or solvent based coating methods.

Melt based coating methods comprise adding particles of breaker, for example potassium persulfate as granules, to a melted mixture of the surfactant in a suitable mixing device to form a slurry. The slurry is then poured onto a rotating disc which is contained in the large end of a tower. The centrifugal action of the spinning disc produces uniform spherical particles consisting of a core of the breaker granule encapsulated in a coating of molten surfactant. The surfactant solidifies in the top of the tower as the encapsulated breaker particles are flung from the disc and fall to a collection chamber at the bottom of the tower. The rotating disc forms droplets of excess surfactant which are small relative to the encapsulated breaker particles. Upon being thrown from, or falling from, the rotating surface, the encapsulated breaker particles and droplets of excess surfactant are solidified by cooling with air and are separated by sieving or other suitable solid size separation method. The solidified droplets of pure surfactant typically are recycled back into the suspension. The breaker particles to be encapsulated may constitute from about 10% up to about 90% by volume of the overall suspension slurry. The ratio of breaker particles to surfactant determines the thickness of the surfactant coating. For thicker surfactant coatings the process can be repeated two or more times. The temperature on the disc surface must be above the melting point of the surfactant encapsulant.

The rotational speed of the disk is chosen so that the excess surfactant forms into spheres that are smaller than the encapsulated breaker particles. For breaker particles in the range of about 0.5 millimeters diameter and specific gravity of about 1.3, a rotational speed of about 1,000 to 1,500 rpm for an eight inch diameter disk provides sufficient disparity of diameter between the fine surfactant particles and the larger encapsulated breaker particles for easy separation.

Encapsulation can also be done using a solvent based method wherein surfactant is dissolved in a volatile organic solvent and the breaker granules are suspended in the solution in a suitable mixing device. The solution is then poured onto the rotating disc, and as warm air or other gas is passed over the disc the volatile solvent evaporates to form particles of breaker encapsulated by surfactant.

Alternatively, encapsulated breakers can be made by the fluid bed encapsulation process known as the Wurster Process. See U.S. Pat. Nos. 3,237,596 and 3,382,093. Encapsulation is achieved by either dip-coating or spray coating a solution of surfactant in a suitable volatile organic solvent into a cascading stream of breaker granules through a fluid bed. Breaker particles can be spray coated by spraying the coating solution above or below the bed in a Wurster fluidized bed. After the coating solution is applied, the organic solvent is dried by evaporation with or without the aid of a flowing drying gas such as air or nitrogen gas. The drying gas temperature can be in the range from ambient temperature up to the boiling point of the organic solvent.

The encapsulating coating can be applied in single or multiple layers depending on the coating thickness required. The following example indicates how the Wurster system can be applied to produce surfactant encapsulated breaker.

EXAMPLE

Four kg of 20–30 mesh sodium persulfate are introduced in to a Wurster insert fluid bed coating machine, manufactured by Glatt Air Techniques Inc., model number GPCG-5. The sodium persulfate is fluidized by passing 130 scfm of heated nitrogen at about 45° C. through the bed. After the bed reaches a temperature of 30° C., a 1.25 weight percent solution of polyoxyethylene dissolved in toluene is sprayed onto the sodium persulfate granules at the Wurster entrance. The spray nozzle used is a commercial two fluid nozzle using nitrogen at 3 bars pressure to form an atomized spray in the Wurster insert. The spraying is continued at 40 gm/min rate until the required thickness of surfactant coating is built up on the sodium persulfate, i.e. approximately 80 minutes per a coating of one weight percent surfactant on the sodium persulfate.

After the solution is sprayed onto the granules in the Wurster insert, the encapsulated breaker granules are blown by the heated nitrogen upwards into the drying section of the machine. Here the solvent is evaporated by the hot gas stream, leaving a coating of dried surfactant on the granules. The dried encapsulated granules fall back into the fluid and then re-enter the Wurster insert where the coating process is repeated. Thus multiple films layers of surfactant are built up until the specified surfactant encapsulant thickness is obtained. The spraying is then stopped and the encapsulated breaker granules are dried with hot nitrogen for five minutes. Typically the amount of surfactant used ranges from about 10 lbs. to about 80 lbs. per 100 lbs. of breaker. The ratio of surfactant to breaker depends on the average particle size of the surfactant granules and the thickness of the surfactant encapsulant desired. The thickness of the surfactant coating is determined by the surfactant concentration requirement in the fracture fluid relative to the breaker concentration requirement. To some degree time to release breaker after the fracturing fluid enters the subterranean formation is affected by the thickness of the encapsulant coating, increasing with increasing thickness. Suitable encapsulant thickness are typically in the range of from about 5 to about 25 microns.

Following is a typical procedure for fracturing a subterranean formation using the fracturing fluids of the present invention. The description is representative of many possible applications of the invention and should not be interpreted as limiting the scope of the appended claims.

Water from a suitable source available at the well site is pumped into a tank. The selected hydratable water soluble polymer viscosifier is added to the water in the tank and batch mixed into the water. The water tank is typically a large tank holding up to about 20,000 gals of water. The polymer and water are mixed using a suitable mixing device such as motor driven propeller or turbine agitator. Alternatively, the polymer and water can be mixed by recirculating the water from the bottom of the tank to the top using a suitable pump such as centrifugal pump. The water and polymer are mixed in the water tank for a time sufficient to uniformly distribute the polymer in the water and to fully hydrate the polymer.

To initiate the fracturing operation, the polymer gel solution is pumped using a transfer pump from the water tank at a controlled rate into and through a blending zone. The transfer pump can be the same pump used to circulate the contents of the water tank to form the polymer solution. The blending zone typically is a tank equipped with an agitator or mixer or it can be a static mixer.

Sand or other suitable proppant is fed at a controlled rate into the blending zone using an auger screw conveyor or other suitable solid feed metering device where the proppant admixes with the flowing water polymer solution forming a slurry. The surfactant encapsulated breaker of the present invention is also fed at a controlled rate into the blending zone using an auger screw conveyor or other suitable solid feed metering device. The breaker feed rate is adjusted to provide the specified concentration of breaker in the fracturing fluid. The thickness of the surfactant coating encapsulating the breaker is selected to provide the specified concentration of surfactant in the fracturing fluid. Other conditioning and treating chemicals required for the fracturing fluid formulation such as pH controlling buffers and clay control agents are fed into the blending zone at a controlled rate where they are mixed uniformly into the fracturing fluid as it flows through the blending zone.

The fracturing fluid flows from the blending zone into the suction of a high pressure pump which boosts the pressure of the fracturing fluid to formation pressure and pumps the fracturing fluid into the well head and down into the subterranean formation being fractured. The fracturing fluid is pumped into the formation at a rate and pressure sufficient to fracture the formation. After the specified amount of fracturing fluid is fed into the formation, the well bore is shut in by closing a valve at the surface. The well is shut in for a time period sufficient to complete fracture closure and to stabilize the fractures. The shut in period can last from several minutes to up to about 12 hours but is typically about one or two hours.

The type and thickness of surfactant encapsulant covering the breaker particles is selected so that surfactant encapsulant melts or dissolves in the fracturing fluid downhole and releases the breaker. The breaker dissolves into the fracturing fluid. The breaker type and amount are selected so that upon release the breaker is sufficiently potent to break the polymer viscosifier at the temperature range in the subterranean formation. The thickness of the surfactant encapsulating coating is specified so that there is adequate surfactant in the fracturing solution to emulsify the residual polymer fragments.

At the end of the shut in period, the shut in valve is opened. The pressure drop in the well that occurs when the valve is opened causes the fracturing fluid, now with viscosity broken, to flow back out of the formation, into the well and back up to the surface. The surfactant dissolved in the broken fracturing fluid disperses the residual broken polymer fragments so that the escaping broken fracturing fluid carries the fragments out of the fractured formation leaving the well in condition to begin production.

What is claimed is:

1. A method for fracturing a subterranean formation penetrated by a well bore comprising the step of pumping an aqueous hydraulic fracturing fluid down the well bore at a pressure and flow rate sufficient to fracture the subterranean formation wherein the fracturing fluid is comprised of a water soluble hydratable polymer, a proppant, and a particulate breaker that is encapsulated by a water soluble surfactant comprising at least one member selected from the group consisting of carboxylates, polyalkoxycarboxylates, alkylbenzenesulfonates, alkylarylsulfonates, lignosulfonates, naphthalenesulfonates, petroleum sulfonates, ethoxylated and sulfated alcohols, ethoxylated and sulfated alkylphenols, sulfated acids, amides and esters, sulfated natural oils and fats, phosphate esters, polyoxyethylene ethoxylates, alkylphenol ethoxylates, carboxylic acid esters, glycero esters, polyoxyethylene esters, ethoxylated natural fats, oils and waxes, glycol esters of fatty acids, carboxylic amides, polyalkylene oxide block copolymers, aliphatic mono, di and polyamines derived from fatty and rosin acids, that is solid at temperatures up to about formation temperatures and dissolves at formation temperatures.

2. The method for fracturing a subterranean formation of claim 1 wherein the surfactant is selected from the group consisting of polyoxyethylene stearyl ether, polyethylene glycol monostearate and polyoxyethylene dinonylphenol ether.

3. The method for fracturing a subterranean formation of claim 1 wherein the water soluble polymer hydratable is a polysaccharide.

4. The method for fracturing a subterranean formation of claim 1 wherein the breaker is selected from the group consisting of alkali and alkaline earth metal persulfates, percarbonates and perchlorates in granular form.

5. The method for fracturing a subterranean formation of claim 4 wherein the breaker is potassium persulfate, ammonium persulfate or sodium persulfate in granular form.

6. An aqueous hydraulic fracturing fluid comprising a water soluble polymer viscosifier, a proppant, and a particulate breaker that is encapsulated by a water soluble surfactant comprising at least one member selected from the group consisting of carboxylates, polyalkoxycarboxylates, alkylbenzenesulfonates, alkylarylsulfonates, lignosulfonates, naphthalenesulfonates, petroleum sulfonates, ethoxylated and sulfated alcohols, ethoxylated and sulfated alkylphenols, sulfated acids, amides and esters, sulfated natural oils and fats, phosphate esters, polyoxyethylene ethoxylates, alkylphenol ethoxylates, carboxylic acid esters, glycero esters, polyoxyethylene esters, ethoxylated natural fats, oils and waxes, glycol esters of fatty acids, carboxylic amides, polyalkylene oxide block copolymers, aliphatic mono, di and polyamines derived from fatty and rosin acids, that is solid at temperatures up to about formation temperature and dissolves at formation temperature.

7. The hydraulic fracturing fluid of claim 6 wherein the surfactant is selected from the group consisting of polyoxyethylene stearyl ether, polyethylene glycol monostearate and polyoxyethylene dinonylphenol ether.

8. The hydraulic fracturing fluid of claim 6 wherein the water soluble polymer viscosifier is a polysaccharide.

9. The hydraulic fracturing fluid of claim 6 wherein the breaker is selected from the group consisting of alkali and alkaline earth metal persulfates, percarbonates and perchlorates in granular form.

10. The hydraulic fracturing fluid of claim 6 wherein the breaker is potassium persulfate, ammonium persulfate or sodium persulfate in granular form.

11. An encapsulated breaker compound for use in hydraulic fracturing fluids comprising:

a) a particulate breaker chemical;

b) a coating comprising a water soluble surfactant comprising at least one member selected from the group consisting of carboxylates, polyalkoxycarboxylates, alkylbenzenesulfonates, alkylarylsulfonates, lignosulfonates, naphthalenesulfonates, petroleum sulfonates, ethoxylated and sulfated alcohols, ethoxylated and sulfated alkylphenols, sulfated acids, amides and esters, sulfated natural oils and fats, phosphate esters, polyoxyethylene ethoxylates, alkylphenol ethoxylates, carboxylic acid esters, glycero esters, polyoxyethylene esters, ethoxylated natural fats, oils and waxes, glycol esters of fatty acids, carboxylic amides, polyalkylene oxide block copolymers, aliphatic mono, di and polyamines derived from fatty and rosin acids, and which is solid at temperatures below about 100° F. and which dissolves at temperatures above about 100° F.

12. The encapsulated breaker claim 11 wherein the surfactant is selected from the group consisting of polyoxyethylene stearyl ether, polyethylene glycol monostearate and polyoxyethylene dinonylphenol ether.

13. The encapsulated breaker of claim 11 wherein the water soluble polymer viscosifier is a polysaccharide.

14. The encapsulated breaker of claim 11 wherein the breaker is selected from the group consisting of alkali and alkaline earth metal persulfates, percarbonates and perchlorates in granular form.

15. The encapsulated breaker of claim 14 wherein the breaker is potassium persulfate, ammonium persulfate or sodium persulfate in granular form.

* * * * *